(12) United States Patent
Park et al.

(10) Patent No.: US 10,387,285 B2
(45) Date of Patent: Aug. 20, 2019

(54) POWER EVALUATOR FOR APPLICATION DEVELOPERS

(71) Applicant: Microsoft Technology Licensing, LLC, Redmond, WA (US)

(72) Inventors: Hee jun Park, Sammamish, WA (US); Sudeesh Reddy Pingili, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/489,595

(22) Filed: Apr. 17, 2017

(65) Prior Publication Data

US 2018/0300215 A1    Oct. 18, 2018

(51) Int. Cl.
*G06F 11/30* (2006.01)
*G06F 11/36* (2006.01)
*G06F 1/32* (2019.01)

(52) U.S. Cl.
CPC ............ *G06F 11/3062* (2013.01); *G06F 1/32* (2013.01); *G06F 11/302* (2013.01); *G06F 11/3664* (2013.01); *G06F 11/3668* (2013.01)

(58) Field of Classification Search
CPC ............ G06F 11/3466; G06F 11/3409; G06F 11/3419; G06F 11/3688; G06F 2201/865;
(Continued)

(56) References Cited

U.S. PATENT DOCUMENTS 7,290,246 B2 * 10/2007 Cyran ................. G06F 11/3017
717/130
7,337,433 B2 * 2/2008 Cyran ................. G06F 11/3017
717/130
(Continued)

OTHER PUBLICATIONS

"Empirical Evaluation of Two Best Practices for Energy-Effcient Software Development"—Giuseppe Procaccianti, Hector Fernandez, Patricia Lago; VU University Amsterdam, De Boelelaan 1081a, 1081 HV, Amsterdam, The Netherlands. Journal of Systems and Software Feb. 24, 2016.*

(Continued)

*Primary Examiner* — Francisco J Aponte
(74) *Attorney, Agent, or Firm* — Workman Nydegger

(57) ABSTRACT

Testing applications on a hardware development platform. A method includes receiving user input, the user input including an executable application. The method further includes executing the executable application on an application development platform and gathering at least one of thermal or electrical power characteristics caused by executing the application on the application development platform. The method further includes. accessing operating conditions for the application development platform. The method further includes accessing a set of one or more predefined threshold end-use platform operating conditions. The method further includes scaling the thermal or electrical power characteristics caused by executing the application on the application development platform based on the threshold end-use platform operating conditions and the operating conditions for the application development platform. The method further includes providing an indication of the application performance to the user based on the scaled thermal or electrical power characteristics.

17 Claims, 4 Drawing Sheets

(58) Field of Classification Search
CPC . G06F 11/3664; G06F 9/45504; G06F 11/261
See application file for complete search history.

(56) References Cited

U.S. PATENT DOCUMENTS

| | | | | |
|---|---|---|---|---|
| 7,395,174 B2* | 7/2008 | Aguilar, Jr. | ............ | G06F 1/206 |
| | | | | 702/130 |
| 7,421,382 B2* | 9/2008 | Blatt | ............... | G06F 17/5022 |
| | | | | 703/13 |
| 7,512,513 B2 | 3/2009 | Johns et al. | | |
| 7,549,069 B2* | 6/2009 | Ishihara | ............ | G06F 17/5022 |
| | | | | 703/13 |
| 8,195,967 B2* | 6/2012 | Archer | ............... | G06F 1/3203 |
| | | | | 713/320 |
| 8,250,389 B2* | 8/2012 | Archer | ............... | G06F 1/32 |
| | | | | 709/201 |
| 8,732,487 B2* | 5/2014 | Goraczko | ............ | G06F 1/3206 |
| | | | | 713/300 |
| 8,756,564 B2* | 6/2014 | Hamilton, II | ............ | G06F 8/73 |
| | | | | 717/110 |
| 8,972,957 B2* | 3/2015 | Bates | ............... | G06F 8/41 |
| | | | | 717/140 |
| 9,008,734 B2 | 4/2015 | Vummintala et al. | | |
| 9,146,275 B2* | 9/2015 | Chase | ............... | G01R 31/31721 |
| 9,176,841 B2* | 11/2015 | Kansal | ............... | G06F 11/3062 |
| 9,189,216 B2* | 11/2015 | Yamamoto | ............ | G06F 11/302 |
| 9,213,624 B2* | 12/2015 | Nair | ............... | G06F 11/3664 |
| 9,310,864 B1* | 4/2016 | Klein | ............... | G06F 1/26 |
| 9,693,308 B2* | 6/2017 | Koo | ............... | H04W 52/0251 |
| 9,703,336 B2* | 7/2017 | Alton | ............... | G06F 1/206 |
| 9,730,038 B2* | 8/2017 | Clark | ............... | H04W 4/003 |
| 9,887,887 B2* | 2/2018 | Hunter | ............... | H04W 4/21 |
| 2004/0268159 A1 | 12/2004 | Aasheim et al. | | |
| 2005/0008069 A1* | 1/2005 | Cao | ............... | G06F 1/28 |
| | | | | 375/224 |
| 2007/0198864 A1* | 8/2007 | Takase | ............... | G06F 1/26 |
| | | | | 713/300 |
| 2007/0245163 A1* | 10/2007 | Lu | ............... | G06F 1/3203 |
| | | | | 713/300 |
| 2009/0119233 A1* | 5/2009 | Dunagan | ............ | G06Q 10/04 |
| | | | | 705/412 |
| 2009/0265568 A1* | 10/2009 | Jackson | ............ | G06F 1/3203 |
| | | | | 713/320 |
| 2010/0205137 A1* | 8/2010 | Barsness | ............ | G06F 1/3203 |
| | | | | 706/52 |
| 2010/0268523 A1* | 10/2010 | Dhanwada | ............ | G06F 11/3013 |
| | | | | 703/21 |
| 2010/0313270 A1* | 12/2010 | Kim | ............... | G06F 1/28 |
| | | | | 726/24 |
| 2012/0011378 A1* | 1/2012 | Dalton | ............... | G06F 11/3062 |
| | | | | 713/300 |
| 2012/0053925 A1* | 3/2012 | Geffin | ............... | H05K 7/1498 |
| | | | | 703/21 |
| 2013/0174128 A1* | 7/2013 | Kansal | ............... | G06F 11/3062 |
| | | | | 717/135 |
| 2013/0211752 A1 | 8/2013 | Shi et al. | | |
| 2014/0181539 A1 | 6/2014 | Lin | | |
| 2014/0236380 A1* | 8/2014 | Alton | ............... | G06F 1/206 |
| | | | | 700/299 |
| 2014/0325481 A1* | 10/2014 | Pillai | ............... | G06F 11/3409 |
| | | | | 717/124 |
| 2015/0031326 A1 | 1/2015 | Begin et al. | | |
| 2016/0062454 A1 | 3/2016 | Wang et al. | | |
| 2018/0004507 A1* | 1/2018 | Aijaz | ............... | G06F 8/70 |

OTHER PUBLICATIONS

"Automatic Application of Power Analysis Countermeasures"—Ali Galip Bayrak, Francesco Regazzoni, David Novo, Philip Brisk, François-Xavier Standaert, and Paolo Ienne. IEEE Transactions on Computers, vol. 64, No. 2, Feb. 2015.*
Likamwa, et al., "Draining our Glass: An Energy and Heat Characterization of Google Glass", In Proceedings of 5th Asia-Pacific Workshop on Systems, Jun. 25, 2014, pp. 1-7.
"Performance recommendations", https://developer.microsoft.com/en-US/windows/holographic/performance_recommendations, Retrieved Date: Sep. 20, 2016, pp. 8.
Chary, et al., "Low Power Intel® Architecture for Small Form Factor Devices", https://software.intel.com/en-us/articles/low-power-intel-architecture-for-small-form-factor-devices, Sep. 2, 2004, pp. 4.
Lowensohn, Josh, "iPhone apps that wouldn't get approved today", https://www.cnet.com/news/iphone-apps-that-wouldnt-get-approved-today/, Sep. 9, 2010, pp. 11.
"Oculus Rift: A Bug with Windows Power Plan Configuration", https://www.andrewmunsell.com/blog/oculus-rift-bug-power-plan-configuration/, Apr. 4, 2016, pp. 11.

* cited by examiner

POWER EVALUATOR FOR APPLICATION DEVELOPERS

BACKGROUND

Background and Relevant Art

The modern computing environment has resulted in the proliferation of computing devices. In particular, often a user will have multiple personal computing devices that the user uses within a particular day. For example, a user will use a mobile device, such as a smart cellular telephone, desktop computer, tablet, virtual reality or mixed reality device, and various other devices throughout the day. Indeed, in modern societies, large portions of the population use multiple different devices in very short time frames.

Additionally, often these various devices use an application model where applications can be quickly and easily distributed with very little application development overhead cost. In particular, different application development platforms can be used by large swaths of developers, who can then share their applications through various applications stores. Thus, modern computing has truly resulted in an environment where many users consume many applications from many developers on many devices.

However, this has resulted in some unique and interesting challenges. In particular, there is a need for application developers to develop applications that are able to function across the multitude of different devices and that will be used in a multitude of different ways by the multitude of different users. Indeed, even different individual devices may vary from device to device in functional capabilities, even when the devices are the same model from the same manufacturer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for testing applications. The method includes receiving user input, the user input including an executable application. The method further includes executing the executable application on an application development platform and gathering at least one of thermal or electrical power characteristics caused by executing the application on the application development platform. The method further includes. accessing operating conditions for the application development platform. The method further includes accessing a set of one or more predefined threshold end-use platform operating conditions. The method further includes scaling the thermal or electrical power characteristics caused by executing the application on the application development platform based on the threshold end-use platform operating conditions and the operating conditions for the application development platform. The method further includes providing an indication of the application performance to the user based on the scaled thermal or electrical power characteristics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Many modern computing devices are implemented in small form factor devices. In this context, it is important to minimize heat generation to avoid thermal shutdown on such devices. Additionally or alternatively, such devices have limited electrical power available as there is limited space and weight constraints restricting the amount of battery storage that can be implemented in the devices.

For example, mobile or wearable devices have very limited thermal power budgets (cooling capability) due to compact form-factors used for thinner and lighter designs. For example, reference is now made to FIG. 1, which illustrates a wearable device 100. In this example, the wearable device 100 is a mixed reality wearable device and in particular is the HoloLens® available from Microsoft Corporation of Redmond, Wash. In the example illustrated in FIG. 1 the wearable device 100 has three power regions each with different thermal power budgets.

For example, the front power region 102, which includes various sensors, one or more cameras, and one or more digital signal processors, has a thermal power budget of about 2100 mW. The right power region 104 also includes various sensors, digital signal processors, and the like. The right power region 104 will typically run workloads that are developed by the wearable device developer, in this case, Microsoft Corporation. In the example illustrated in FIG. 1, the right power region 104 has a thermal power budget of about 2400 mW.

Figure 1:
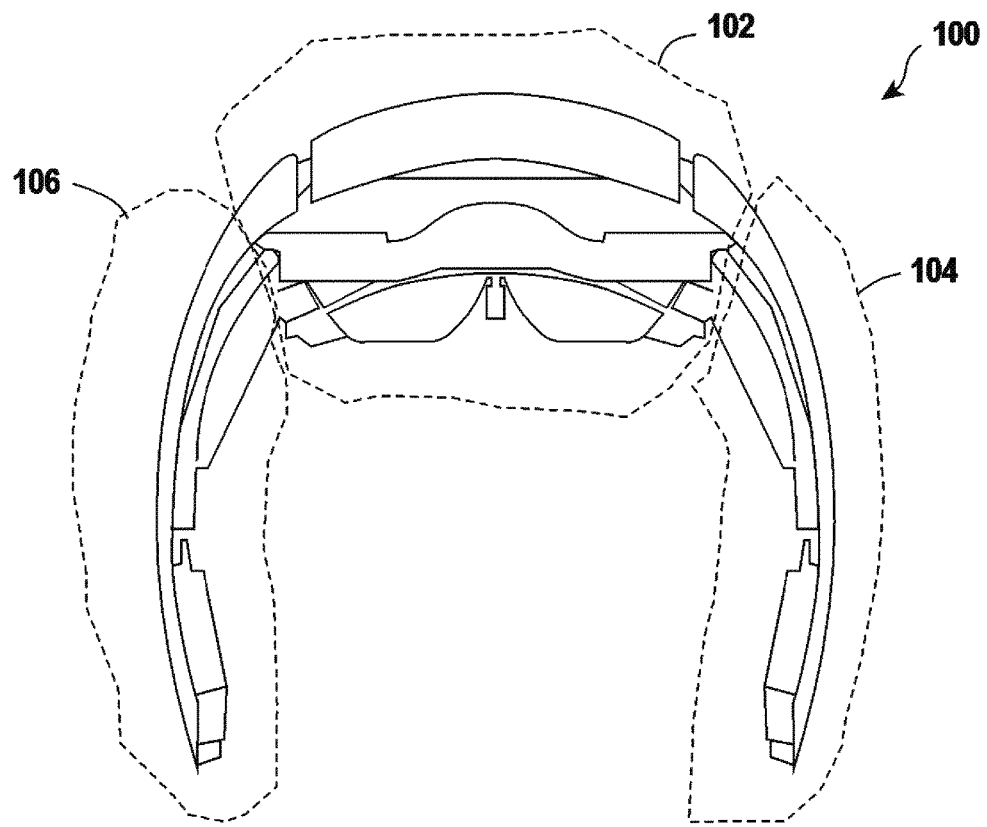
FIG. 1 illustrates a wearable device with a limited power budget.

FIG. 1 further illustrates a left power region 106 on the wearable device 100. In the example illustrated, the left power region includes an application processor, a system on chip, WiFi, etc. The left power region 106, in the illustrated example, includes the hardware and functionality for running user developed applications. In the example illustrated, the left power region 106 has a power budget of approximately 2900 mW. Some embodiments illustrated herein may include functionality for determining if applications can be run in the different power regions of such a wearable device, or other devices.

Figure 2:
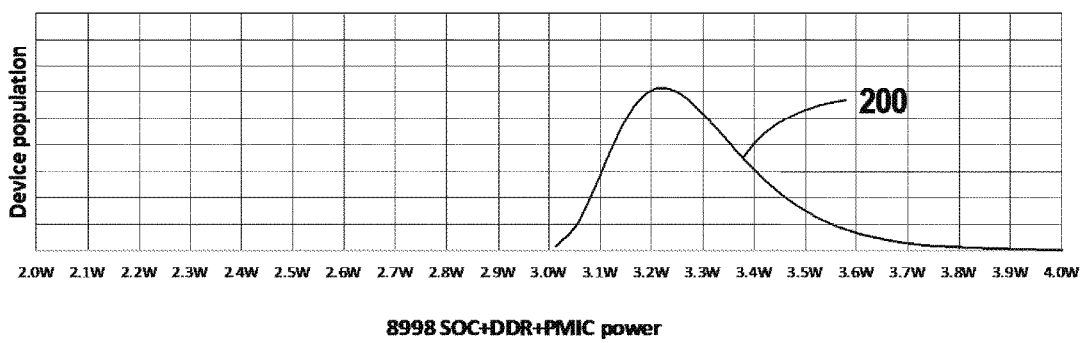
FIG. 2 illustrates a power distribution curve showing the distribution of parts with respect to power consumption.

Illustrating now additional details with respect to application workloads in general, for the exact same application software workload, there are noticeable power differences depending on device-to-device differences, including different devices from different manufacturers, but also production variations for the different devices of the same model from the same manufacturer. For example, reference is now made to FIG. 2. FIG. 2 illustrates a power distribution curve 200 illustrating system on chip part-to-part power distribution. In particular, the power distribution curve 200 shows the distribution of different system on chip electrical power usages for a test load for different parts. As can be observed, different parts, with the exact same part number, and produced by the same manufacturer using the same manufacturing processes, exhibit different electrical power characteristics. In particular, some system on chip parts are able to perform the same work and consume lower power than other parts performing the exact same work under exactly the same operating conditions.

There are also noticeable power differences in electrical power consumption depending on operating conditions.

Various embodiments illustrated herein implement an application testing system that is able to execute an executable application and to determine thermal or electrical power characteristics of the system when executing the executable application. The testing system can then access operating conditions of the testing system while executing the executable application. The testing system can further access a set of threshold end-use platform operating conditions that represent threshold conditions under which an application and a device running the application may be subjected to. The testing system can use the thermal or electrical power characteristics of the system when executing the application, along with the operating conditions of the testing system while executing the application, and the set of threshold end-use platform operating conditions (representing expected end-user device conditions) to determine a scaled thermal or electrical power characteristic. The testing system can then provide output to a user to indicate to the user performance characteristics of the application. In particular, the testing system can help a developer determine if their application will meet certain performance characteristics, such as thermal or electrical power budgets, when the application is deployed to large swaths of user devices used by large swaths of users in various different ways.

Figure 3:
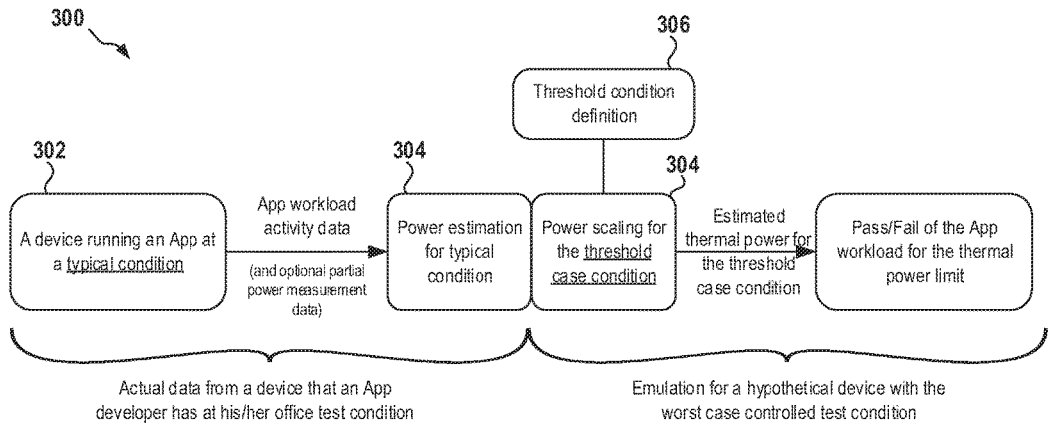
FIG. 3 illustrates a flow showing a process for scaling power.

Reference is now made a FIG. 3 which illustrates a flow of the above described actions. In particular FIG. 3 illustrates a flow 300. FIG. 3 illustrates that a device is running in a typical condition at 302. This is not necessarily a most extreme condition under which the device may be operating in under real world conditions. As illustrated in FIG. 3, application workload activity data and optionally power measurement data may be collected. This data may be used, as illustrated at 304, to directly determine a power estimation for the conditions under which the device is running. That is, this information may be used to estimate power usage in a typical condition if the device is tested under typical conditions. FIG. 3 illustrates that a threshold condition definition, as illustrated at 306, is used to perform power scaling for the threshold case condition as illustrated at 308. As illustrated in FIG. 3, this can be used to estimate the thermal power usage for the threshold case condition. A determination can then be made, as illustrated at 310, to determine if the device will pass or fail when executing the application workload based on a particular predefined thermal power limit. While the pass/fail determination is illustrated in FIG. 3, it should be appreciated that in other embodiments, more granular data may be provided to a user to assist the user in evaluating an application.

Figure 4:
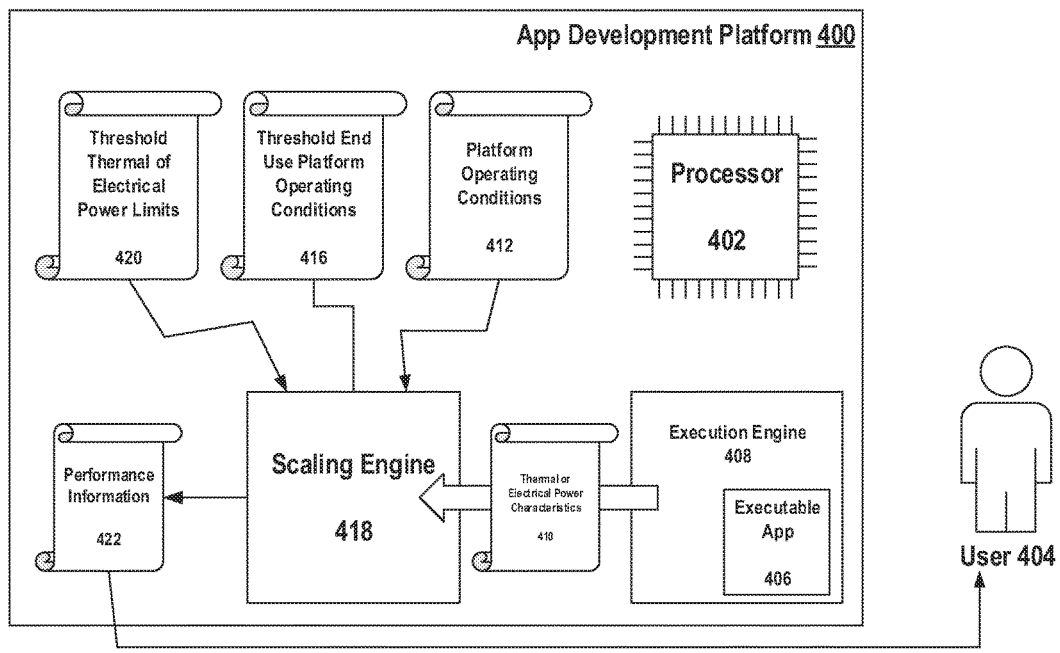
FIG. 4 illustrates an application development platform.

Referring now to FIG. 4, an example is illustrated. FIG. 4 illustrates an application development platform 400. For example, the application development platform 400 may include a standalone developer tool installed on a computing device. Alternatively, or additionally, the application development platform 400 may be part of an application store for delivering applications to end-users. The application development platform 400 includes various hardware components. Of particular interest, is the processor 402 included on the application development platform 400. As will be illustrated in more detail below, particular characteristics of the processor 402 can affect how an executable application executes on the application development platform 400.

The user 404 is able to provide an executable application 406 to the application development platform 400. For example, this may be accomplished by the user 404 providing to the application development platform 402 application code that makes up the executable application 406. Alternatively or additionally, the user 404 can provide application code that makes up the executable application 406 in the form of executable files, or other executable objects executable by the application development platform 400.

The executable application 406 is provided to an execution engine 408 on the application development platform 400. The execution engine 408 may be an execution container that is configured to execute the executable application 406. Additionally, the execution engine 408, or other components on the application development platform, can observe and collect thermal or electrical power characteristics 410. For example, the application development platform 400, and often the processor 402 in particular, will have a power characteristic including dynamic power and leakage power. Dynamic power is useful electrical power that is able to power processes that are desirable when running the executable application 406. For example, dynamic power may be used to render graphics to a screen, perform useful computations, output sound to a sound a device, generate network traffic, etc. Leakage power, on the other hand, is power that is wasted power in that it is not used to provide any useful functions.

Note that the operating conditions of the application development platform 400 may affect a ratio of dynamic power to leakage power. In particular, dynamic power will generally remain constant over a range of operating conditions of the application development platform 400. In contrast, leakage power often varies as operating conditions of the application development platform change. For example, if the application development platform 400 is operated at 25° C. and 20 Watts of leakage power are produced while operating at that temperature, an increase in temperature to 35° C. may cause 60 Watts of leakage power to be produced. At the same time, at 25° C., 80 of dynamic power may be produced in the illustrated example, while the same 80 Watts of dynamic power are produced at 35° C. Note that this is simply one example and other examples will be illustrated below.

While the examples illustrated it herein focus on power usage, it should be appreciated that in some embodiments, thermal characteristics may alternatively or additionally be taken into consideration. In particular, embodiments may attempt to determine the amount of thermal energy that is generated by a device under certain operating conditions. Note that often, thermal power and electrical power are related. Embodiments can then attempt to estimate an amount of thermal power produced when operating under threshold end-use platform operating conditions. Thus, while the examples illustrated here in focus on electrical power usage, it should be appreciated that in other embodiments, similar determinations may be made for thermal power usage. Indeed, in some embodiments, electrical power usage can be translated directly into thermal power generation.

As noted, the application development platform 400, and the processor 402 in particular, are operated at some operating conditions 412. A number of different operating conditions may exist. For example, some operating conditions may relate to the environment in which the application development platform 400 is operated. For example, one operating condition refers to the ambient temperature in which the application development platform 400 is being operated. The ambient temperature will typically affect the junction temperature of various devices in the processor 402. Higher junction temperatures typically result in a higher leakage power to dynamic power ratio.

Other operating conditions may relate to physical characteristics of components in the application development platform 400. For example, as noted above in the discussion related to FIG. 2, the processor 402 may have various characteristics that affect electrical or thermal power performance. As noted previously, components may have part-to-part variations that occur in the production process.

For example, in processor manufacturing, processors will be categorized along a statistically defined leakage distribution, such as that illustrated in FIG. 2. That is, some processors will have a higher leakage power to dynamic power ratio than other processors. The processors will fall within some statistical distribution for leakage power. While the majority of the processors will have 'good' leakage power characteristics, there are some processors that will have better than good leakage power characteristics and some processors that will have worse than good leakage power characteristics. Manufacturers can fuse details of this characteristic to the processor when the processor is manufactured. In particular, fusing means that a manufactures will provide a static, machine readable code on a processor die that identifies, within some range, leakage power characteristics. For example, this code may be provided in a static register similar to a read only memory that can be read to identify how the particular processor compares to other processors. In this way, if a developer is able to read the static code from the processor, the developer can ascertain how the particular processor 402 that they are using to develop the executable application 406 compares to other processors manufactured by the same manufacture. Part-to-part variation information may additionally or alternatively be obtained for memory or other parts.

Similar to the leakage power distribution, devices such as processors may belong to an operating voltage distribution. In particular, the operating voltage for some processors to function properly may be higher than the operating voltage required for other processors to function properly. Processors operating at higher voltages typically have a higher leakage power to dynamic power ratio.

The age of devices can also affect the leakage power to dynamic power ratio. In particular, as semiconductor devices age, they become less efficient due to contamination growth. Thus, older devices will have a higher leakage power to dynamic power ratio than newer devices.

Different devices from different vendors may also have different leakage power to dynamic power ratios.

Various other factors may contribute to the leakage power to dynamic power ratios or power consumption of devices. Such factors may include WiFi RF signal strength, battery charging status, running of background processes on a device, etc.

Still other factors may affect leakage power to dynamic power ratios. For example, other examples of this data are processor frequency (typically measured in MHz), the number of active processors, processor utilization (typically measured as a percentage) processor IPC (Instruction per Clock), GPU frequency (typically measured in MHz), GPU utilization (typically measured as a percentage), DDR read and write traffic (typically measured in Mbytes/second), DDR frequency (typically measured in MHz), DDR active duration or idle (i.e., self refresh) duration (typically measured as a percentage), WiFi transfer data rate (typically measured in Mbps), WiFi PA (Power Amplifier) output signal strength setting, SOC eFuse (as illustrated above) (e.g., ATE (Automatic Test Equipment) characterization) data including leakage and Si speed, etc.

Note that while the above factors have been described as affecting the leakage power to dynamic power ratio, many of the same factors could also affect the thermal power output of devices on which an application may be run. Thus, the magnitude of these characteristics will affect the thermal power output and the thermal operating temperature of a device on which an application 406 is being run.

The operating conditions 412 can be determined at the application development platform 400 in a number of different fashions. For example, as noted above, components such as the processor 402 may have codes embedded (e.g., fused) in them that identify certain conditions. For example, codes embedded on the processor 402 will identify manufacturing date. Codes on the processor 402 may identify an inherent leakage power characteristic based on a distribution of processors manufactured by manufacture. In some embodiments, these characteristics are readable by the application development platform 400 for use in performing useful computations.

Certain operating conditions in the operating conditions 412 may be measured at the application development platform 400. For example, ambient temperature can be measured by a temperature sensing device at the application development platform 400. Alternatively or additionally, the application development platform 400 may be able to determine the operating voltage at which the processor 402 was being operated. Alternatively or additionally, the application development platform 400 is able to determine what applications are running in the background on the application development platform 400. Alternatively or additionally, the application development platform 400 can measure processor speeds, processor workloads, WiFi Power output, etc.

The following now illustrates additional details of some embodiments that can be used to test the execution of the application 406 on the application development platform 400 in a fashion that takes into account the variations that may be encountered by executing the application 406 on other devices by other users.

In some embodiments, a user 404, or other entity, is able to provide threshold end-user platform operating conditions 416. The threshold end-user platform operating conditions 416 represent a defined so-called 'worst case' condition definition. While this may not be an absolute worst-case scenario, it may represent reasonable assumptions about how the application 406 will be used on various devices and by various users. The threshold end-use platform operating conditions 416 define details of an allowable 'worst-case' scenario in which the application 406 may be run. The application development platform 400 uses this as a reference end-use platform for determining if the application can be successfully run on the reference end-use platform.

The threshold end-use platform operating conditions 416 may define for example the location of a processor in a distribution for operating voltage or leakage power to dynamic power ratio or other characteristic. The threshold end-use platform operating conditions 416 may define a junction temperature at which the processor 402 will be operated. The threshold end-use platform operating conditions 416 may define an age for a processor. The threshold end-use platform operating conditions 416 may define WiFi RF signal strength. Indeed, the threshold end-use platform operating conditions 416 may define any one of a number of different characteristics such as those illustrated above for the operating conditions 412. Such characteristics may include one or more of: ambient temperature (and/or junction temperature); inherent leakage power of a device; operating voltage of a device; age of a device; WiFi or other wireless communication signal strength; battery charging status; power consumed by other applications running on a device; processor frequency; the number of active processors; processor utilization; processor IPC; GPU frequency; GPU utilization; DDR read and write traffic; DDR frequency; DDR active duration or idle duration; WiFi transfer data rate; WiFi PA output signal strength settings; SOC eFuse data including leakage and Si speed; etc.

The definition of the reference end-use platform case as defined by the threshold end-use platform operating conditions 116 can be predetermined and fixed. Alternatively, this can be updated and downloaded over a network connection from a remote telemetry server. Alternatively or additionally, the definition of the reference end-use platform can be dynamic such that various different factors may be defined in the threshold end-use platform operating conditions 116 to change over time, such that different conditions may be tested over time.

Embodiments can perform power scaling based on the threshold end-use platform operating conditions 416, the operating conditions 412, and the thermal or electrical power characteristics 410 generated by the execution engine 408 executing the executable application 406. In particular, FIG. 4 illustrates a scaling engine 418 that receives as input the threshold end-use power operating conditions 416, the operating conditions 412, and the thermal or electrical power characteristics 410. Power scaling of the thermal or electrical power characteristics 410 is performed by scaling those characteristics 410 from the operating conditions 412 to the threshold end-use platform operating conditions 416. Based on the given 'worst case' conditions defined in the threshold end-use platform operating conditions 416, the scaling engine 418 scales up the estimated power consumption and/or thermal heat generation caused by executing the application 406 on the application development platform 400.

Various modalities may be used to scale the thermal or electrical power characteristics 410. For example, in one embodiment, reference tables may be used for scaling. For example, the application development platform 400 can store a table that correlates application development platform operating conditions with thermal or electrical power characteristics. Knowing the operating conditions 412 of the application development platform 400, the table can be referenced to determine how the thermal or electrical power characteristics 410 should be scaled if their operating conditions were those as defined in the threshold end-use platform operating conditions 416.

In an alternative or additional implementation, detailed power models of processor, GPU. DDR, and other subsystems can be used to generate more accurate power scaling.

Some embodiments include functionality for thermal power pass/fail evaluation. Because the device temperature changes (due to conduction) much slower than dynamic power changes and workload changes, some embodiments can take the moving average of estimated power for a predetermined time period (e.g., 20 seconds or 1 minutes or 10 minutes). Then, this moving average of the estimated and averaged power is compared with some predetermined thermal power limit. For example, FIG. 4 further illustrates that the scaling engine 418 receives as input threshold thermal or electrical power limits 420. If the scaled thermal power is higher than the thermal power limit (which in some cases may require that the limits be exceeded for some period of time) a 'fail' message can be generated. In some embodiments to fail message can be provided as performance information 422 to the user 404. This can allow the user 404 to adjust the code in the executable application 406 to attempt to compensate and generate an application that does not fail testing performed at the application development platform 400.

Embodiments can be implemented to determine that a thermal power budget is not exceeded for some defined time period. Alternatively or additionally, embodiments can be implemented to determine that a temperature limit is not exceeded for some defined time period. Often, this will be done, in both cases, as a moving average of thermal power or temperature. Note that in the temperature case, the predetermined amount of time may be variable. Thus, higher temperatures will likely be allowed to persist for shorter periods of time than lower temperatures will be allowed persist before a failure condition is identified.

Figure 5:
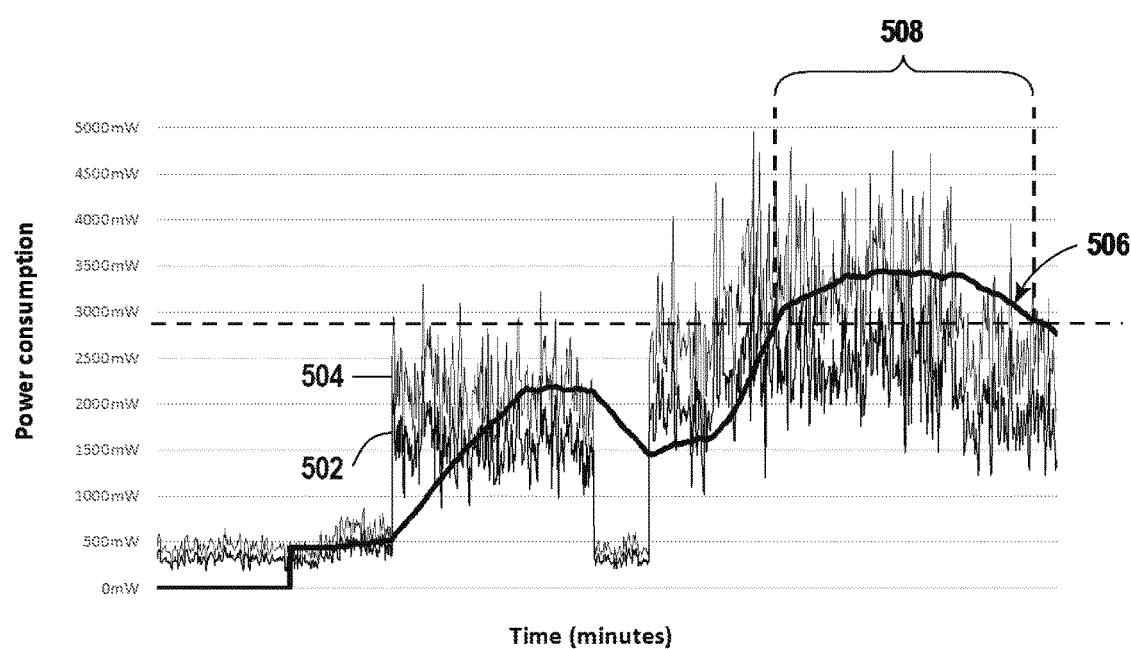
FIG. 5 illustrates a graph graphing power consumption over time.

FIG. 5 shows an example of real-time power estimation line 502, power scaling line 504 for the reference end-use platform, and a moving line 506 showing the average thermal power.

When the average thermal power stays above some predefined thermal threshold for longer than a predetermined duration (perhaps as defined in the threshold thermal or electrical power limits 420), as illustrated at 508, the application development platform 400 will output a failure notification in the performance information 422.

This performance information 422 can be provided to an application developer, which in this case is the user 404. The application developer then knows that their application 406 has too high of a workload for a 'worst case' reference device and operating environment as defined in the threshold end-use platform operating conditions 416. This can inform the user 404 that optimizations need to be performed on the executable application 406.

Embodiments may be configured to provide additional details and performance information 422 than simply an indication of passing a test or failing the test. For example, embodiments may provide information to the user 404 which includes information representing the information shown in FIG. 5, that is, thermal information over time. Alternatively or additionally, the threshold end-use platform operating conditions 416 may define dynamic conditions over time such that the scaling engine 418 can provide results that correlate to dynamically changing threshold end-use platform operating conditions. This allows the user 404 to identify particular end-use conditions that most seriously adversely affect the thermal or electrical power characteristics of a device when executing the executable application 406.

The information in the performance information 422 can help the application developer to analyze and optimize the application 406 workload. For example, the user can use the information in the performance information 422 to identify an amount of power gap (i.e., how much power should be reduced), the expected sustain time of the application workload before thermal shutdown, power breakdown for each subsystem in a device, power breakdown for each task (process), etc.

In some embodiments, output data including power or temperature estimated for devices operating under the threshold end-use platform operating conditions 416, can be fed into an actual thermal management system 424 existing on the application development platform 400 to emulate end-use device performance and behavior for the threshold end-use operation conditions 116 that cause device throttling. That is, device throttling can be performed on the application development platform 400 to limit device performance of the application development platform 400 based on the threshold end-use platform operating conditions 416, rather than on the actual conditions, to emulate what might be experienced if the application development platform 400 were operating at the threshold end-use platform operating conditions 416. Note that the device (i.e., the application development platform 400) that an application developer (i.e., the user 402) is using is likely to be a typical device, operated under typical conditions such that it may not show any performance degradation due to thermal management (performance throttling) absent the emulation. However, as illustrated herein, a so called 'worst case' situation can be emulated on the application development platform 400 to allow the user 402 to experience a user experience, including device in a 'worst case' situation.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
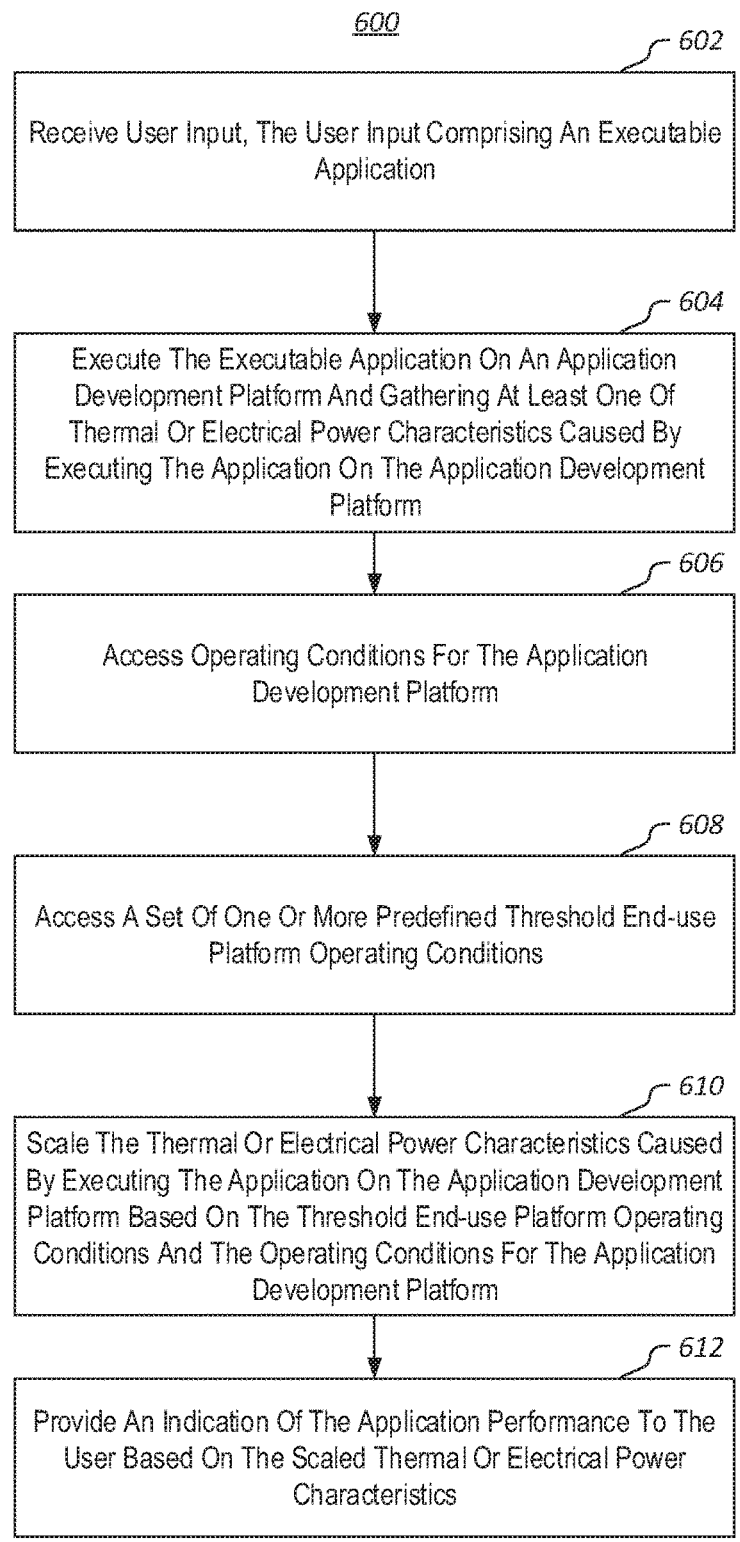
FIG. 6 illustrates a method of testing applications.

Referring now to FIG. 6, a method 600 is illustrated. The method includes acts for testing applications. The method includes receiving user input, the user input comprising an executable application (act 602). For example, as illustrated in FIG. 4, The user 404 provides an executable application 406, which is received by the execution engine 408 of the application development platform 400.

The method 600 further includes executing the executable application on an application development platform and gathering at least one of thermal or electrical power characteristics caused by executing the application on the application development platform (act 604). For example, the execution engine 408 may execute the executable application 406 to generate thermal or electrical power characteristics 410.

The method 600 further includes accessing operating conditions for the application development platform (act 606). For example, as illustrated in FIG. 4, a scaling engine 418 receives platform operating conditions 412.

The method 600 further includes accessing a set of one or more predefined threshold end-use platform operating conditions (act 608). For example, FIG. 4 illustrates that the scaling engine 418 receives threshold end use platform operating conditions 416.

The method 600 further includes scaling the thermal or electrical power characteristics caused by executing the application on the application development platform based on the threshold end-use platform operating conditions and the operating conditions for the application development platform (act 610). For example, the scaling engine 418 may perform the scaling as previously indicated.

The method 600 further includes providing an indication of the application performance to the user based on the scaled thermal or electrical power characteristics (act 612). For example, FIG. 4 illustrates performance information 422 that is provided to the user 404.

The method 600 may be practiced where the application development platform includes an application store. Alternatively or additionally, the method 600 may be practiced where the application development platform includes a stand-alone development tool.

The method 600 may further include accessing a set of one or more threshold thermal or electrical power limits. For example, FIG. 4 illustrates that the scaling engine receives threshold thermal or electrical power limits 420. Such embodiments may further include determining that the scaled the thermal or electrical power characteristics exceeds the threshold power or thermal limits. Such embodiments may further include, as a result of determining that the scaled the thermal or electrical power characteristics exceeds the threshold power or thermal limits, notifying the user of an application test failure. Note that in some embodiments.

The method 600 may be performed where the operating conditions for the application development platform include at least one of ambient temperature, leakage power distribution, junction temp, operating voltage distribution, or age.

The method 600 may be performed where the one or more predefined threshold end-use platform operating conditions include at least one of ambient temperature, leakage power distribution, junction temp, operating voltage distribution, or age.

The method 600 may further include throttling the application development platform based on scaled thermal or electrical power characteristics.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented application development platform comprising:
   one or more processors;
   a hardware device having stored thereon computer executable instructions that when executed by the one or more processors implement an execution engine, by causing the processors to perform operations comprising:
      receiving an executable application from a user;
      executing the executable application received from the user; and
      generating thermal or electrical power characteristics that result from execution of the executable application; and
   wherein the hardware device has stored thereon computer executable instructions that when executed by the one or more processors implement a scaling engine, by causing the processors to perform operations comprising:
      receiving platform operating conditions indicating conditions in which the application development platform is running while executing the application, comprising at least one of ambient temperature of the application development platform, power distribution information fused into a processor used in the application development platform, junction temperature of a processor used in the application development platform, operating voltage distribution information defining an operating voltage for a processor used in the application development platform, or age of a processor used in the application development platform;
      receiving threshold end-use platform operating conditions indicating potential conditions under which the application may be executed;
      receiving the thermal or electrical power characteristics from the execution engine, generated by executing the executable application;
      scaling the thermal or electrical power characteristics, generated by executing the executable application, based on the threshold end-use platform operating conditions as compared to the platform operating conditions in which the application development platform is running, to estimate different thermal or electrical power characteristics that would occur if the application were executed in the potential conditions.

2. The application development platform of claim 1, wherein operations implementing the scaling engine further comprise providing performance information to a user.

3. The application development platform of claim 2, wherein the performance information comprises an indication of a test failure.

4. The application development platform of claim 1, wherein the application development platform is implemented on an application store.

5. The application development platform of claim 1, wherein the application development platform is throttled based on scaled thermal or electrical power characteristics.

6. A computer system comprising:
one or more processors; and
one or more computer-readable media having stored thereon instructions that are executable by the one or more processors to configure the computer system implement a computer implemented system to test applications, including instructions that are executable to configure the computer system to perform at least the following:
receive user input, the user input comprising an executable application;
execute the executable application on an application development platform and gather at least one of thermal or electrical power characteristics caused by executing the application on the application development platform;
access operating conditions for the application development platform, comprising at least one of ambient temperature of the application development platform, power distribution information fused into a processor used in the application development platform, junction temperature of a processor used in the application development platform, operating voltage distribution information defining an operating voltage for a processor used in the application development platform, or age of a processor used in the application development platform;
access a set of one or more predefined threshold end-use platform operating conditions;
scale the thermal or electrical power characteristics caused by executing the application on the application development platform based on the threshold end-use platform operating conditions as compared to the operating conditions for the application development platform to estimate different thermal or electrical power characteristics that would occur if the application were executed in the one or more predefined threshold end-use platform operating conditions; and
provide an indication of the application performance to the user based on the scaled thermal or electrical power characteristics.

7. The computer system of claim 6, wherein the application development platform comprises an application store.

8. The computer system of claim 6, wherein the application development platform comprises a stand-alone development tool.

9. The computer system of claim 6, the one or more computer-readable media having stored thereon instructions that are executable by the one or more processors to configure the computer system:
access a set of one or more threshold thermal or electrical power limits;
determine that the scaled the thermal or electrical power characteristics exceeds the threshold power or thermal limits; and
as a result of determining that the scaled the thermal or electrical power characteristics exceeds the threshold power or thermal limits, notify the user of an application test failure.

10. The computer system of claim 6, wherein the one or more predefined threshold end-use platform operating conditions comprise at least one of ambient temperature of the end-use platform, power distribution information for a processor in the end-use platform, junction temperature of a processor in the end-use platform, operating voltage distribution information defining an operating voltage for a processor used in the platform, or age of a processor used in the end-use platform.

11. The computer system of claim 6, wherein one or more computer-readable media further have stored thereon instructions that are executable by the one or more processors to configure the computer system to throttle the application development platform based on scaled thermal or electrical power characteristics.

12. In a computing environment, a computer implemented method of testing applications, the method comprising:
receiving user input at a computer implemented application development platform, the user input comprising an executable application;
executing the executable application on the application development platform and gathering at least one of thermal or electrical power characteristics caused by executing the application on the application development platform;
accessing operating conditions for the application development platform, comprising at least one of ambient temperature of the application development platform, power distribution information fused into a processor used in the application development platform, junction temperature of a processor used in the application development platform, operating voltage distribution information defining an operating voltage for a processor used in the application development platform, or age of a processor used in the application development platform;
accessing a set of one or more predefined threshold end-use platform operating conditions;
scaling the thermal or electrical power characteristics caused by executing the application on the application development platform based on the threshold end-use platform operating conditions as compared to the operating conditions for the application development platform to estimate different thermal or electrical power characteristics that would occur if the application were executed in the one or more predefined threshold end-use platform operating conditions; and
providing an indication of the application performance to the user based on the scaled thermal or electrical power characteristics.

13. The method of claim 12, wherein the application development platform comprises an application store.

14. The method of claim 12, wherein the application development platform comprises a stand-alone development tool.

15. The method of claim 12, further comprising:
- accessing a set of one or more threshold thermal or electrical power limits;
- determining that the scaled the thermal or electrical power characteristics exceeds the threshold power or thermal limits;
- as a result of determining that the scaled the thermal or electrical power characteristics exceeds the threshold power or thermal limits, notifying the user of an application test failure.

16. The method of claim 12, wherein the one or more predefined threshold end-use platform operating conditions comprise at least one of ambient temperature of the end-use platform, power distribution information for a processor in the end-use platform, junction temperature of a processor in the end-use platform, operating voltage distribution information defining an operating voltage for a processor used in the platform, or age of a processor used in the end-use platform.

17. The method of claim 12, further comprising throttling the application development platform based on scaled thermal or electrical power characteristics.

\* \* \* \* \*